United States Patent
Calvarese et al.

(10) Patent No.: US 9,001,621 B2
(45) Date of Patent: Apr. 7, 2015

(54) DUAL FREQUENCY ULTRASONIC LOCATIONING SYSTEM

(75) Inventors: Russell E. Calvarese, Stony Brook, NY (US); Richard J. Lavery, Huntington, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 466 days.

(21) Appl. No.: 13/452,261

(22) Filed: Apr. 20, 2012

(65) Prior Publication Data

US 2013/0279295 A1    Oct. 24, 2013

(51) Int. Cl.
*G01S 3/80*    (2006.01)

(52) U.S. Cl.
CPC ........................ *G01S 3/80* (2013.01)

(58) Field of Classification Search
CPC .......................................................... G01S 3/80
USPC ......................................... 367/100, 127, 129
See application file for complete search history.

(56) References Cited

U.S. PATENT DOCUMENTS

| | | | |
|---|---|---|---|
| 6,404,703 B1 * | 6/2002 | Burrell | 367/128 |
| 8,531,917 B2 * | 9/2013 | Cui et al. | 367/124 |
| 8,750,076 B2 * | 6/2014 | Miyamoto et al. | 367/128 |
| 2002/0151767 A1 | 10/2002 | Sonnenschein et al. | |
| 2002/0155845 A1 * | 10/2002 | Martorana | 455/456 |
| 2008/0095401 A1 | 4/2008 | Saleh et al. | |
| 2008/0128178 A1 * | 6/2008 | Jia | 178/18.01 |

FOREIGN PATENT DOCUMENTS

| | | | |
|---|---|---|---|
| EP | 1717597 A2 | | 11/2006 |
| JP | 2006023261 | * | 1/2006 |
| JP | 2006023261 A | | 1/2006 |
| WO | 2007013069 A1 | | 2/2007 |

OTHER PUBLICATIONS

International Search Report and Written Opinion for International Patent Application No. PCT/US2013/32941 mailed Aug. 7, 2013.

* cited by examiner

*Primary Examiner* — Mark Hellner

(57) ABSTRACT

A dual frequency ultrasonic locationing system includes an emitter operable to emit two different ultrasonic frequencies simultaneously in one ultrasonic burst. A receiver with at least two microphones is operable to receive the ultrasonic burst. A correlator is operable to correlate the signals obtained from each microphone to derive a time difference of arrival of the ultrasonic burst at each microphone. The time difference of arrival of the ultrasonic signal from the emitter impinging on each microphone of the receiver is utilized to determine a location of the emitter.

7 Claims, 10 Drawing Sheets

DUAL FREQUENCY ULTRASONIC LOCATIONING SYSTEM

FIELD OF THE DISCLOSURE

The present disclosure relates generally to an ultrasonic locationing system, and more particularly to locating ultrasonic tags using dual emitter frequencies.

BACKGROUND

An ultrasonic receiver can be used to determine the location of items that contain ultrasonic emitters, such as a mobile device present within a retail, factory, or warehouse environment, for example. The ultrasonic emitter can transmit ultrasonic energy in a short burst which can be received by an ultrasonic transducer (microphone) in the ultrasonic receiver, thereby establishing the presence of the device within the environment.

Further, the use of several ultrasonic microphones distributed within the environment can also be used to provide a specific location of a particular device using techniques known in the art such as triangulation, trilateration, and the like. However, unlike radio frequency locationing systems, ultrasonic locationing systems suffer from particular problems related to the character of ultrasonic sound waves and their environment of use. Firstly, ultrasonic waves are typically subject to acoustic reverberation due to multipath reflections. Therefore, a signal sent by an emitter can be interfered with by its own reverberations. Secondly, ultrasonic signals are easily subject to noise.

A solution to this problem is to provide a very short burst width of an ultrasonic signal from the emitter such that a signal sent by any emitter in the system will be properly received by the receiver before any multipath energy is included in the signal. In addition, a narrow bandwidth (high Q) receiver can be used to reject nearby environmental acoustic noise while being able to receive the very short burst. However, a very short burst of an ultrasonic signal implies a slow amplifier response time, and little information can be added to the burst, if any.

Accordingly, there is a need for an improved technique to resolve the above issues with an ultrasonic locationing system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
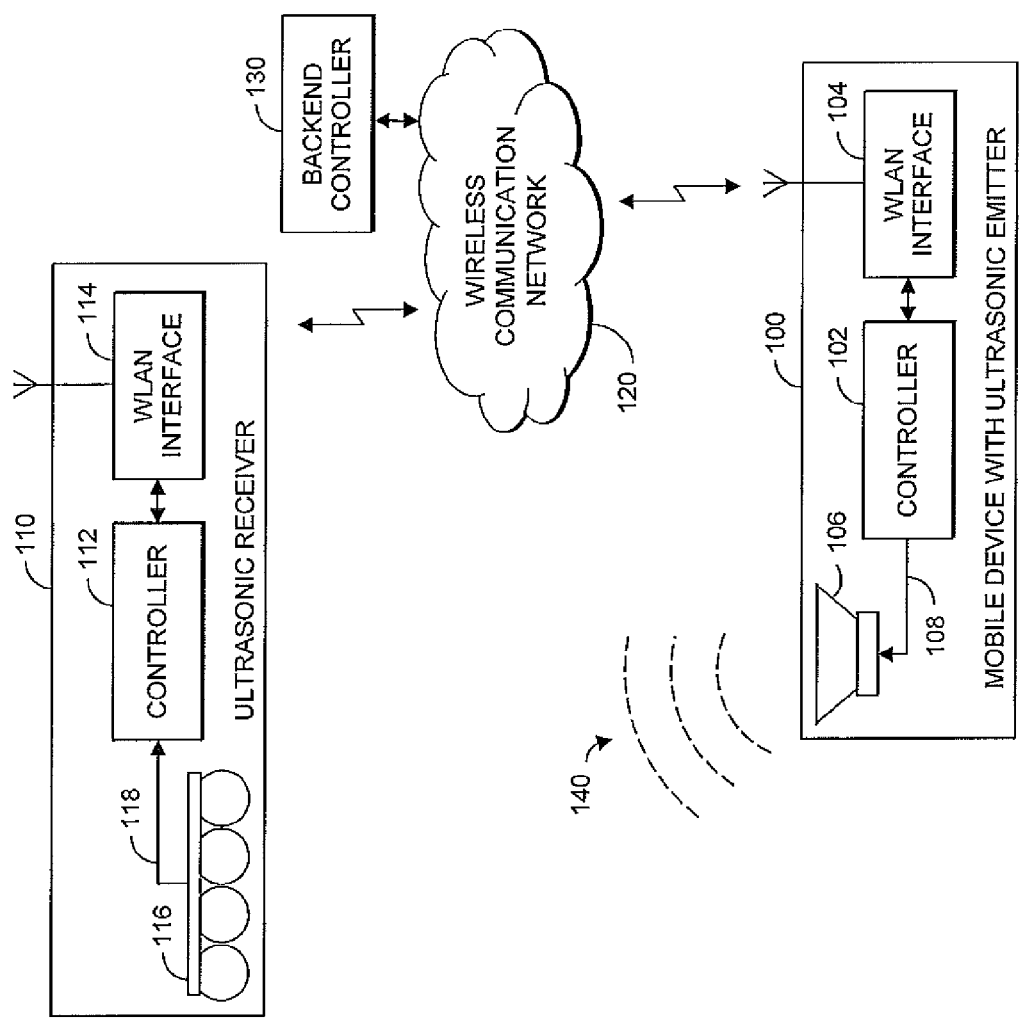
FIG. 1 is a simplified block diagram of an ultrasonic locationing system, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, an improved technique is described to resolve the issues with ultrasonic locationing of a device with an ultrasonic emitter within an environment. In particular, the present invention utilizes a cross correlation of ultrasonic signals impinging on multiple microphones for more accurate locationing of a mobile device. Specifically, the present invention recognizes that an ideal reception of a burst, using perfectly matched ideal amplifiers yields very little cross correlation strength. In addition, while it is commonly known that noise does not correlate, noise does reduce the cross correlation strength and can shift the point of maximum cross correlation. Moreover, due to the relatively low speed of ultrasonic signals it proves difficult to be sure exactly which ultrasonic cycle is the correct cycle to be correlated to. As a result, picking the correct cross correlation cycle when the signal-to-noise ratio drops below ideal conditions is not possible with any known techniques. The present invention resolves this difficulty by using dual emitter frequencies, as will be described below.

The device to be locationed and incorporating the emitter(s) can include a wide variety of business and consumer electronic platforms such as cellular radio telephones, mobile stations, mobile units, mobile nodes, user equipment, subscriber equipment, subscriber stations, mobile computers, access terminals, remote terminals, terminal equipment, cordless handsets, gaming devices, personal computers, and personal digital assistants, and the like, all referred to herein as a device. Each device comprises a processor that can be further coupled to a keypad, a speaker, a microphone, a display, signal processors, and other features, as are known in the art and therefore not shown.

Various entities are adapted to support the inventive concepts of the embodiments of the present invention. Those skilled in the art will recognize that the drawings herein do not depict all of the equipment necessary for system to operate but only those system components and logical entities particularly relevant to the description of embodiments herein.

For example, routers, controllers, switches, access points/ ports, and wireless clients can all includes separate communication interfaces, transceivers, memories, and the like, all under control of a processor. In general, components such as processors, transceivers, memories, and interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement one or more processors that perform the given logic. Therefore, the entities shown represent a system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

FIG. 1 is a block diagram of a dual frequency ultrasonic locationing system, in accordance with the present invention. One or more ultrasonic transponders such as a piezoelectric speaker or emitter 106 can be implemented within a mobile device 100. The emitter can send a short burst of ultrasonic sound (e.g. 20) to indicate the presence of the mobile device 100 within the environment. The mobile device can include a controller 102 to provide at least two specific frequency components 108 to be transmitted by the emitter(s) 106. The controller 102 can also be coupled to a wireless local area network interface 104 for wireless communication with other devices in the communication network 120.

The wireless communication network 120 can include local and wide-area wireless networks, wired networks, or other IEEE 802.11 wireless communication systems, including virtual and extended virtual networks. However, it should be recognized that the present invention can also be applied to other wireless communication systems. For example, the description that follows can apply to one or more communication networks that are IEEE 802.xx-based, employing wireless technologies such as IEEE's 802.11, 802.16, or 802.20, modified to implement embodiments of the present invention. The protocols and messaging needed to establish such networks are known in the art and will not be presented here for the sake of brevity.

An ultrasonic receiver 110 includes a transducer such as one or more ultrasonic microphone 116 that can respond to an ultrasonic sound pressure wave (e.g. 20) transmitted from the ultrasonic emitter 106 of the mobile device. Each microphone 116 provides electrical signals 118 to a receiver circuitry including signal processors (not shown) and a controller 112, such that the receiver controller will be aware of the presence of a device incorporating that ultrasonic emitter within the environment. The receiver controller 112 can also be coupled to a wireless local area network interface 114 for wireless communication with other devices in the communication network 120. Alternatively, the controller 112 could be connected to the communication network 120 through a wired interface connection (not shown), such as an Ethernet interface connection.

In order to provide positioning ability, using a multilateration technique for example, the transducer of the present invention includes a plurality of microphones 116 able to discriminate between different arrival times of a particular ultrasonic signal. In one embodiment, there are four microphones 116 integrated within a single receiver 110 housing. In this embodiment, three of the microphones can be disposed at each apex of a substantially triangular configuration, such as in a substantially flat triangular housing, and are configured in an array having a maximum dimension of not more than twelve inches, and where the fourth microphone is disposed in the middle of the triangular configuration, substantially coplanar with the other microphones. For unobtrusiveness and clear signaling, the housing can be affixed to a ceiling of the environment, where the position of each microphone is known and fixed. Of course, it should be recognized than many different housing and microphone configurations could be utilized with any number of microphones. However, the embodiment described herein utilizes relatively closely-spaced microphones within a singular housing, where the closeness of the microphones is accommodated by the present invention as described below.

As the location and position of these microphones 116 is known and fixed, a signal received by these microphones can be used to locate and track the position of an emitter device using: time difference of arrival (TDOA) at each microphone multilateration, or other suitable locationing technique.

In the embodiment described herein, the mobile device simultaneously emits dual frequencies at 40.3 kHz and 49.0 kHz in one ultrasonic burst, although it should be realized that other frequencies could be used. The simultaneously emission may be accomplished by the controller driving one emitter at both frequencies, or by the controller driving two emitters, one at each frequency. Also, it may be that more than one mobile device within the environment carries an emitter. In this case, the same frequencies can be used for all devices or different frequencies can be used for each device to better distinguish the devices by the receiver. In addition, the emitter frequencies of one device could be changed during operation. Choosing which frequencies to use can be accomplished by a backend controller 130 of the locationing system, which can communicate over the communication network 120 in order to direct different mobile devices 100 to emit the same or different frequencies in its an ultrasonic signal burst. For example, the backend controller can communicate with the mobile device to cause it to transmit an ultrasonic burst with two frequencies. Upon receiving the burst, the receiver 110 can communicate with the backend controller over the communication network that it has received the burst, and the backend controller will then know that the burst came from a particular mobile device.

The backend controller also knows when the burst was sent, and can then determine the flight time of the burst by subtracting the emitting time from the acknowledgment of the reception time from the receiver, i.e. RF synchronization. Alternatively, the backend controller could also radio the time of the originating burst to the receiver which would allow the receiver to convert TDOA values into flight times allowing trilateration, which has accuracy advantages over multilateration is some cases. Flight time can also be calculated once the position is determined by multilateration by simply taking the square root of the sum of the squares of the emitter's relative position in three dimensional space of the environment and then dividing by the speed of sound. It should be noted that the radio frequency communications are relatively instantaneous next to the flight time of the ultrasonic signal and could be ignored. Using a locationing technique such as multilateration, along with the flight time, the receiver 110 could determine and inform the backend controller of the location of the mobile device, which the backend controller can use to track its location during subsequent bursts.

In the above scenario, the receiver is subject to reverberations of the ultrasonic signal due to multipath and reflections. Therefore, the ultrasonic burst must have a very short burst width such that the capture window is closed before any multipath energy is included in the cross correlation. If not, ultrasonic signal collisions could occur, and emitter signals would not be received properly. In addition, the receiver is configured to have a narrow bandwidth (high Q) receiver to reject as much environmental acoustic noise as possible. In this example, it is assumed that a 300μS ultrasonic burst is emitted by the emitter.

Typically, for a single frequency burst, as each microphone of the receiver receives the ultrasonic burst the receiver can use cross-correlation of the burst to determine a direction of an emitter along with distances between microphones to determine flight time distance. For example, existing ultrasonic locationing systems have used a microphone spacing that is typically ten feet. Such system can simply correlate on burst envelopes. However, a microphone spacing of one foot, as in the present invention, requires correlation to an exact sine wave cycle of a burst. In this case, correlation accuracy drops since correlation must identify the correct correlation peak of the cycle. In particular, the locationing accuracy for closely-spaced microphone decreases with distance. Specifically, the sine wave correlations could shift an entire wavelength at the slow speeds of ultrasonic frequencies, thereby providing an incorrect distance calculation. At 40 kHz, the period is 25 μs. Therefore, locking correlation to the wrong sine wave cycle can introduce integer multiple errors of ±25 μs, 50 μs or even 75 μs, which can be many feet of location error.

Figure 2:
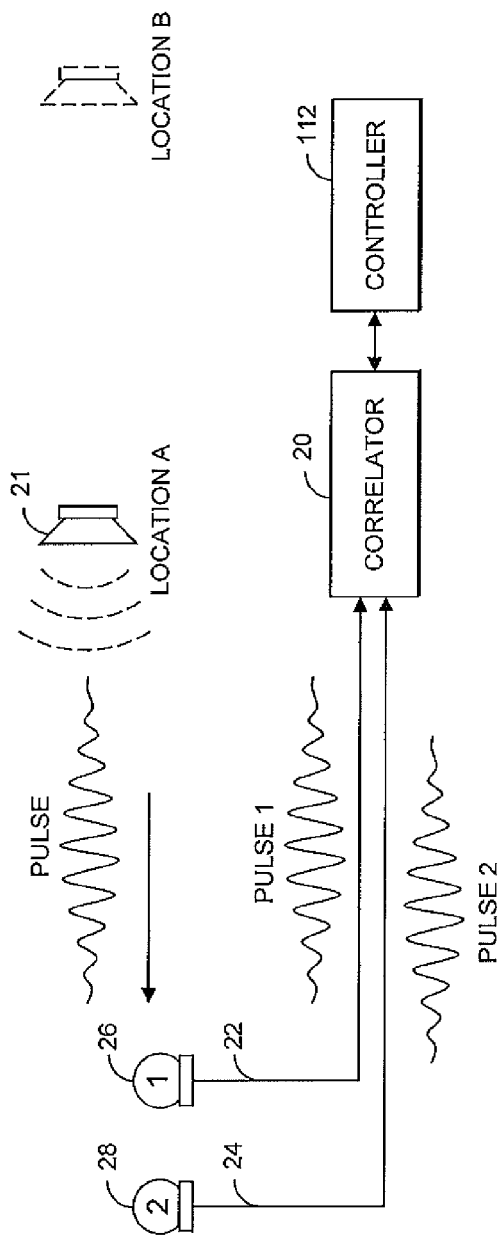
FIG. 2 is a simplified block diagram of a two microphone receiver, in accordance with some embodiments of the present invention.

FIG. 2 shows a single frequency correlation using two closely-spaced microphones. A correlator 20 is provided under control of a controller 112. A mobile device with an emitter 21 emits a single frequency ultrasonic pulse which impinges on the microphones, reaching the first microphone 26 before the second microphone 28. Although only two microphones are shown and the pulse is applied collinearly with respect to the microphone positions, it should be recognized that the number and position of the microphones can be expanded into a three dimensional environment. As shown, the correlator 29 obtains the pulse 22 from the first microphone and the pulse 24 from the second microphone as two time shifted signals.

Figure 3:
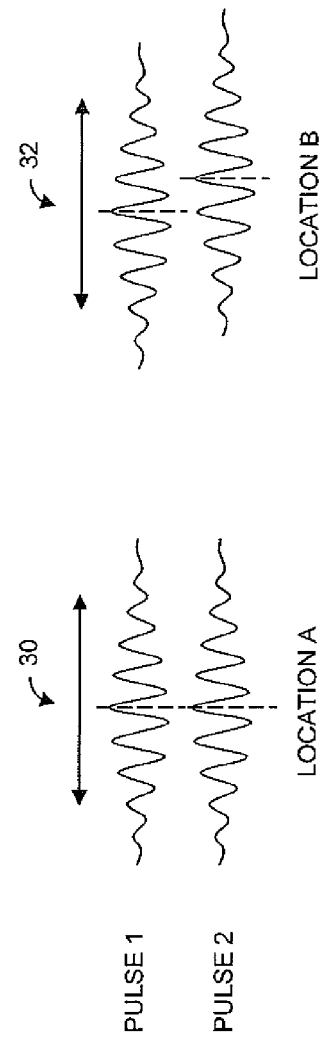
FIG. 3 is a simplified graphical representation of the operation of the correlator of FIG. 2.

FIG. 3 shows the correlation function in the correlator. Specifically, the correlator takes the two obtained signals and correlates them, as is known in the art, by time shifting one signal over the other to find a point with the closest match of the waveforms. The amount if time shifting needed to correctly align the waveforms defines the time difference of arrival (TDOA) of the pulse between the microphones, which can then be used to locate the emitter. In the first correlation 30, the correlator finds the proper correlation of pulse 1 and 2, which the receiver can use to properly locate the emitter at location A (see FIG. 1). However, if the correlator aligns to an improper waveform match, such as matching a sine wave cycle of one pulse to an adjacent cycle 32 of the other pulse, then the calculation of the location of the emitter with be off by 25 μs, for example, which will improperly locate the emitter at location B, for example.

Even if using a separate flight time calculation using RF synchronization, correlation to the wrong sine wave cycle cannot be tolerated. The key to implementing a precision ultrasonic locationing system with small receiver geometry (approximately one foot microphone spacing) is the accurate measurement of the TDOA of the ultrasonic burst between the microphones. However, accurate TDOA measurements have proven to be problematic in single frequency systems with narrow receiver bandwidths (i.e. high Q factor). An ultrasonic receiver system necessitates a high system Q factor to maximize signal-to-noise ratio in an environment where acoustic noise is abundant. This high Q factor inhibits the designing of a pulse shape that will facilitate accurate correlation results.

Figure 4:
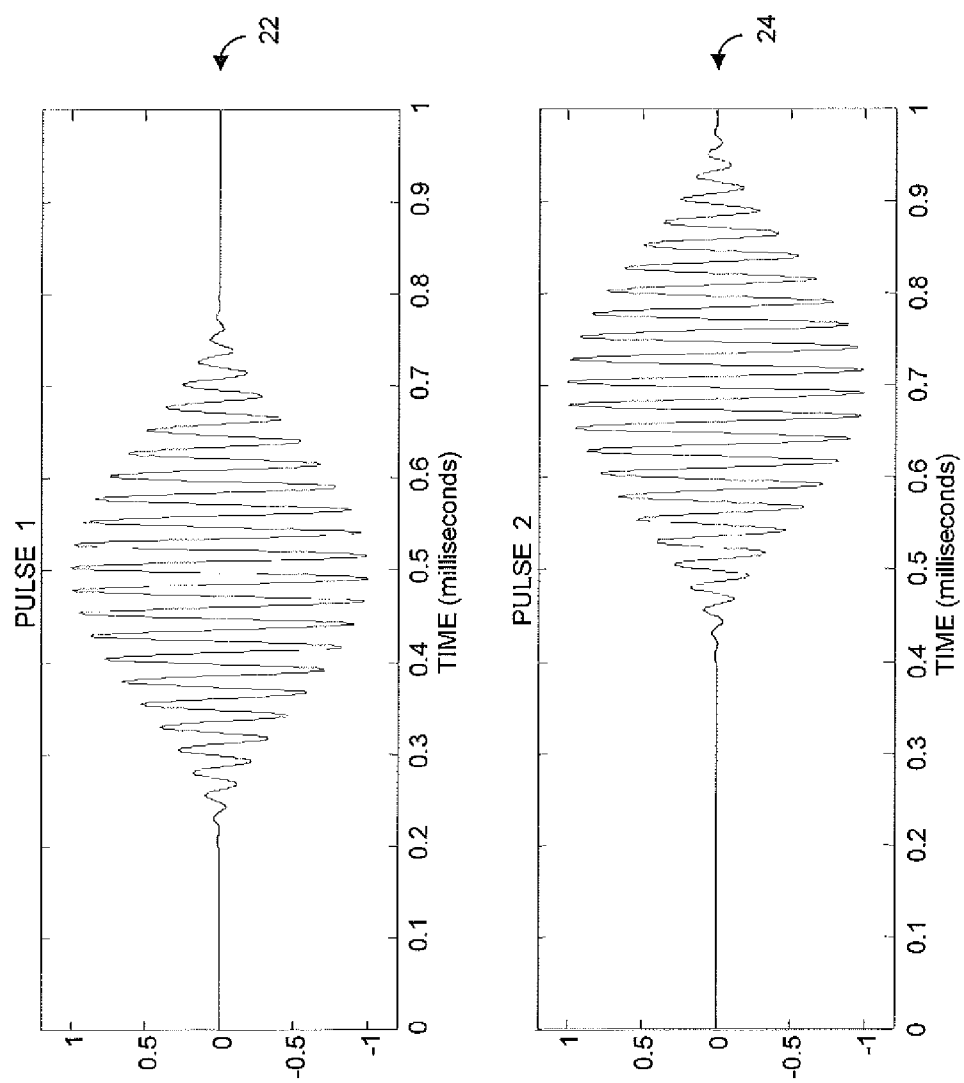
FIG. 4 is a graphical representation of an ideal single frequency ultrasonic burst received by two different microphones.

As shown in FIG. 4, the pulse shape that results from a high Q system consists of a single frequency sine wave with amplitude that slowly rises and then decays. Two single frequency pulses of 40 kHz in a high Q receiver are shown in this ideal representation. In this example, pulse 1 is the ultrasonic pulse received by a first microphone and pulse 2 is that same ultrasonic pulse received by a second microphone, but later in time. These two pulses are cross correlated with each other to yield the correlation buffer shown in FIG. 5.

Figure 5:
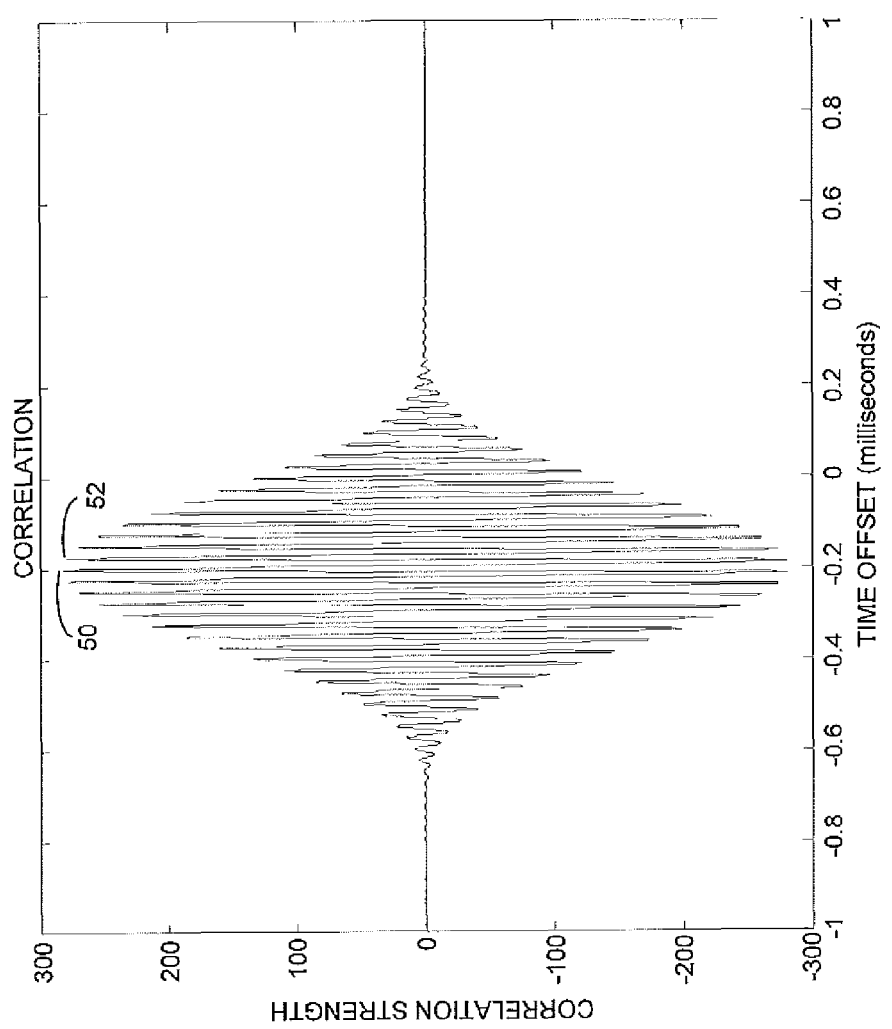
FIG. 5 is a graphical representation of an ideal correlation result from the two pulses of FIG. 4.

FIG. 5 shows the correlation buffer results from two ideal 40 kHz pulses in a high Q system. The key point to recognize here is how close in amplitude the adjacent correlation peaks are at±one cycle away from the maximum correlation point. In particular, the margin between the maximum correlation point 50 and an adjacent correlation point 52 in this ideal case is only 1.1%. In actuality, these pulse shapes are slightly different from each other and can be affected by a number of different external factors that cannot be controlled (i.e. noise level, microphone response, electronic component tolerances, etc.). Since the correlation margins are so weak to begin with, slight differences in the external factors will most likely result in incorrect correlation results and therefore incorrect TDOA measurements.

Therefore, the present invention introduces simultaneously emitted dual frequencies for correlation. The present invention allows the ultrasonic locationing system to more consistently produce accurate TDOA measurements with the addition of a second frequency in the ultrasonic burst emitted from the emitter without any loss in system Q factor or signal-to-noise ratio. The key piece of information that is makes this possible is the difference in phase between the two frequencies. An embodiment of a receiver of the present invention is shown in FIG. 6.

Figure 6:
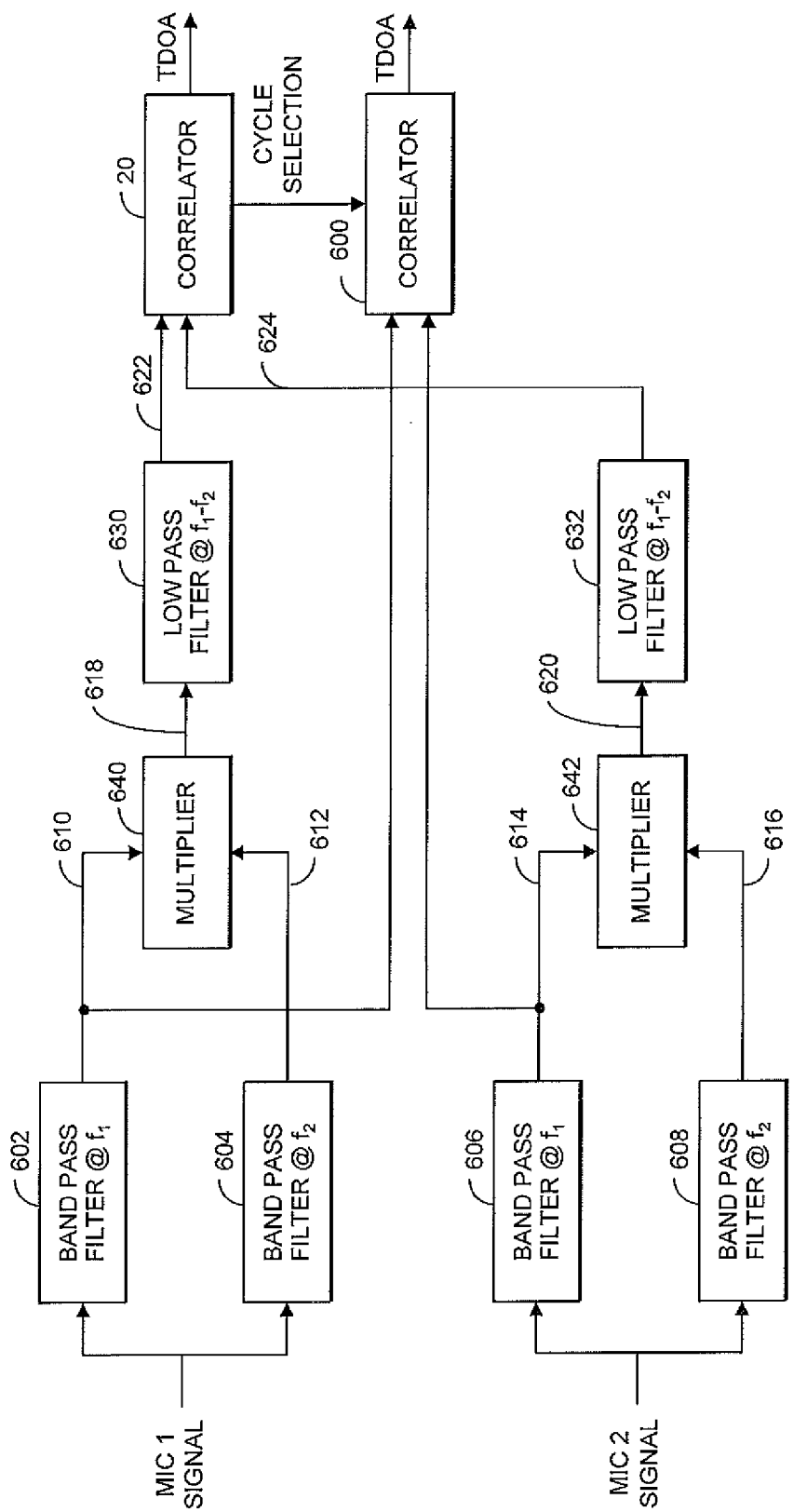
FIG. 6 is a simplified block diagram of a receiver, in accordance with some embodiments of the present invention.

FIG. 6 shows a simplified block diagram of a dual frequency receiver, in accordance with the present invention. It is envisioned that this receiver is implemented in the digital domain, in a digital signal processor for example. It should be recognized that other components, including a controller, amplifiers, analog-to-digital converters (i.e. digitizers), digital filters, and the like, are not shown for the sake of simplicity of the drawings. The microphone signals contain dual frequencies, $f_1$ and $f_2$, that have been simultaneously emitted in one ultrasonic pulse. These microphone signals have then been amplified in high Q amplifier chains and digitized before being provided to the receiver. Preferably, matched components are used for the first and second high Q microphone signal chains to the receiver. Optionally, each receiver chain could be equipped with its own digitizer.

The receiver splits each microphone pulse into its two frequency components, $f_1$ and $f_2$, by passing each microphone signal through two different band pass filters. One band pass filter 602 has a center frequency at $f_1$ and passes the first frequency component of the first microphone (i.e. pulse 1). Another band pass filter 604 has a center frequency at $f_2$ and passes the second frequency component of the first microphone (i.e. pulse 1). Similarly, another band pass filter 606 has a center frequency at $f_1$ and passes the first frequency component of the second microphone (i.e. pulse 2). Another band pass filter 608 has a center frequency at $f_2$ and passes the second frequency component of the second microphone (i.e. pulse 2).

Figure 7:
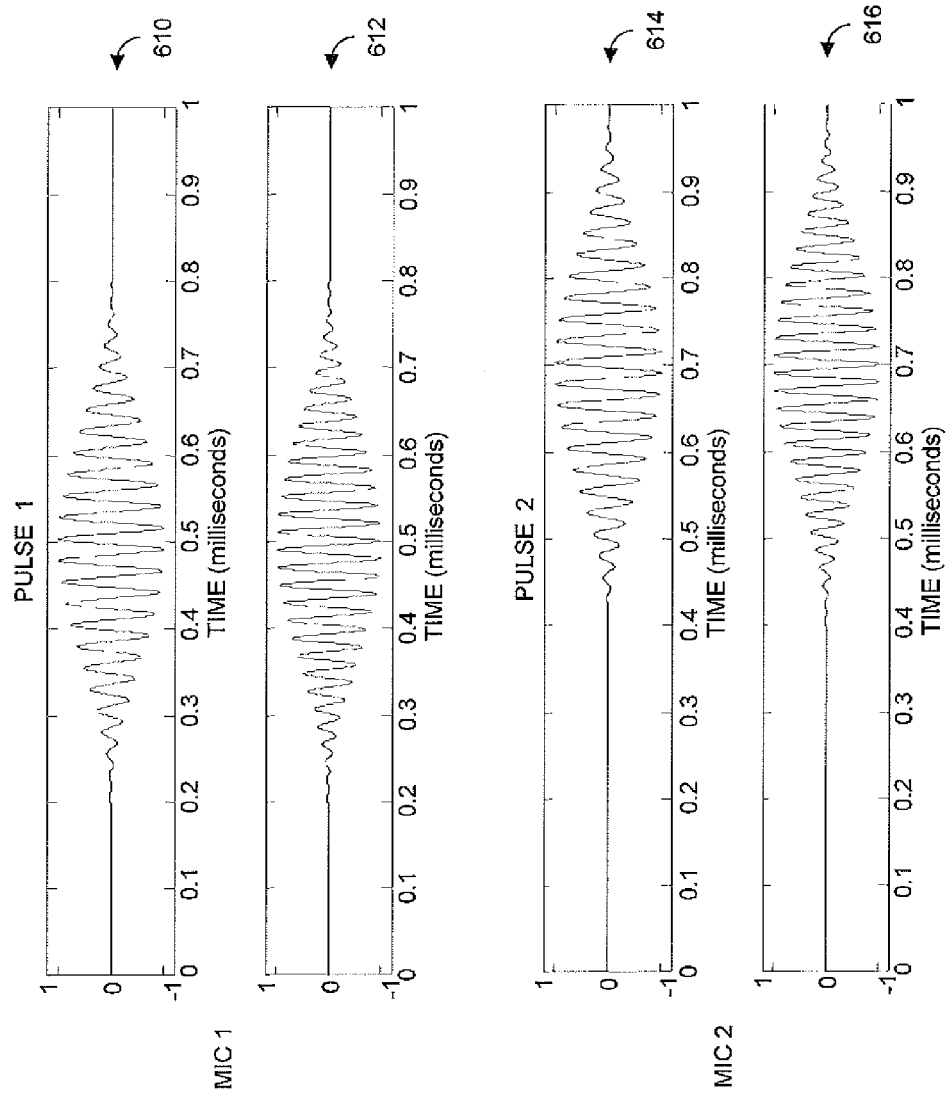
FIG. 7 is a graphical representation of separated different frequency components received in each microphone path of the receiver of FIG. 6.

FIG. 7 shows the individual frequency components output from the band pass filters. In the example described herein, the lower first frequency components 610, 614 are at 40.3 kHz and the higher second frequency components 612, 616 are at 49.0 kHz. Although it should be recognized that two other frequencies can be used.

Figure 8:
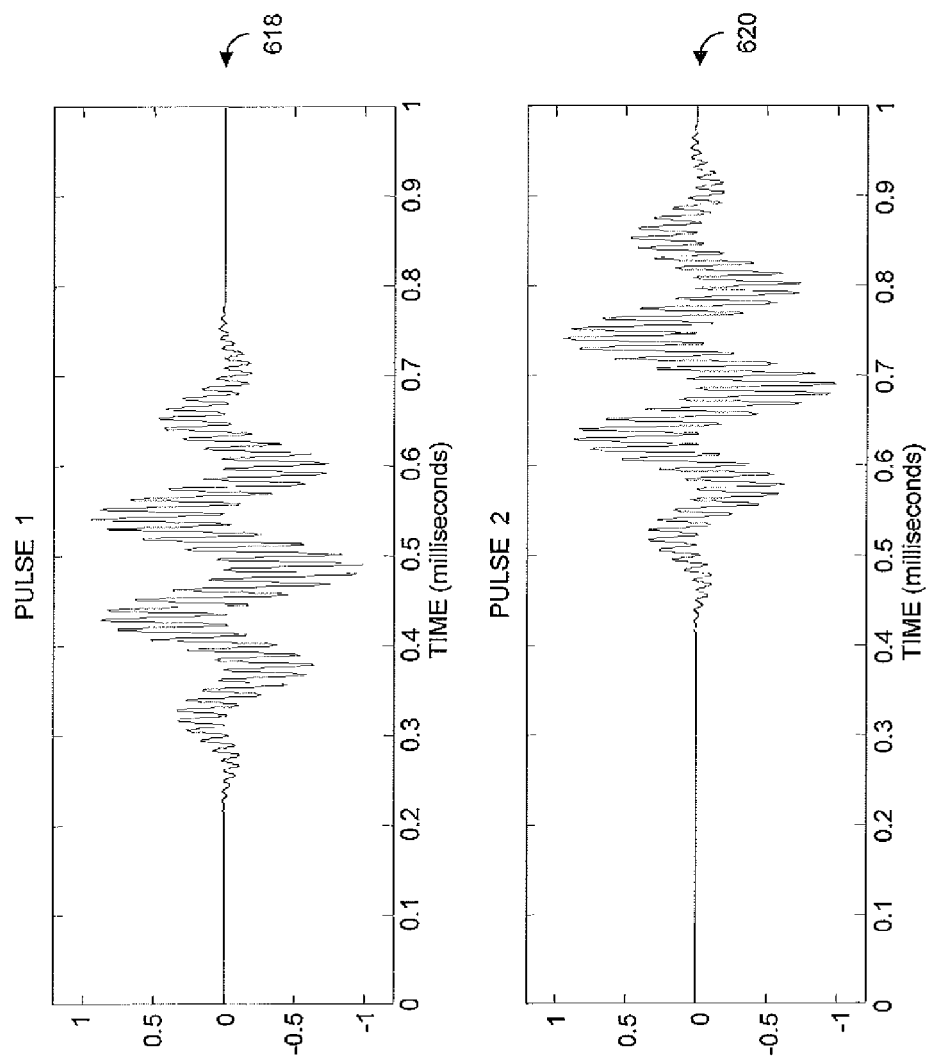
FIG. 8 is a graphical representation of multiplication products of the different frequency components of FIG. 7.

Referring back to FIG. 6, the output from each band pass filter is combined in a digital multiplier which provides sum and difference products of the first and second frequency components. FIG. 8 shows the multiplied product of the two frequency components of each receiver after being multiplied in the digital domain. In particular, the pulse 1 frequency components 610 and 612 produce the product 618 in multiplier 640, and the pulse 2 frequency components 614 and 616 produce the product 620 in multiplier 642. Inasmuch as $f_1$ is 40.3 kHz and $f_2$ is 49.0 kHz, the combined waveform includes 89.3 kHz products (49.0 kHz+40.3 kHz) and 8.7 kHz products (49.0 kHz−40.3 kHz)

Figure 9:
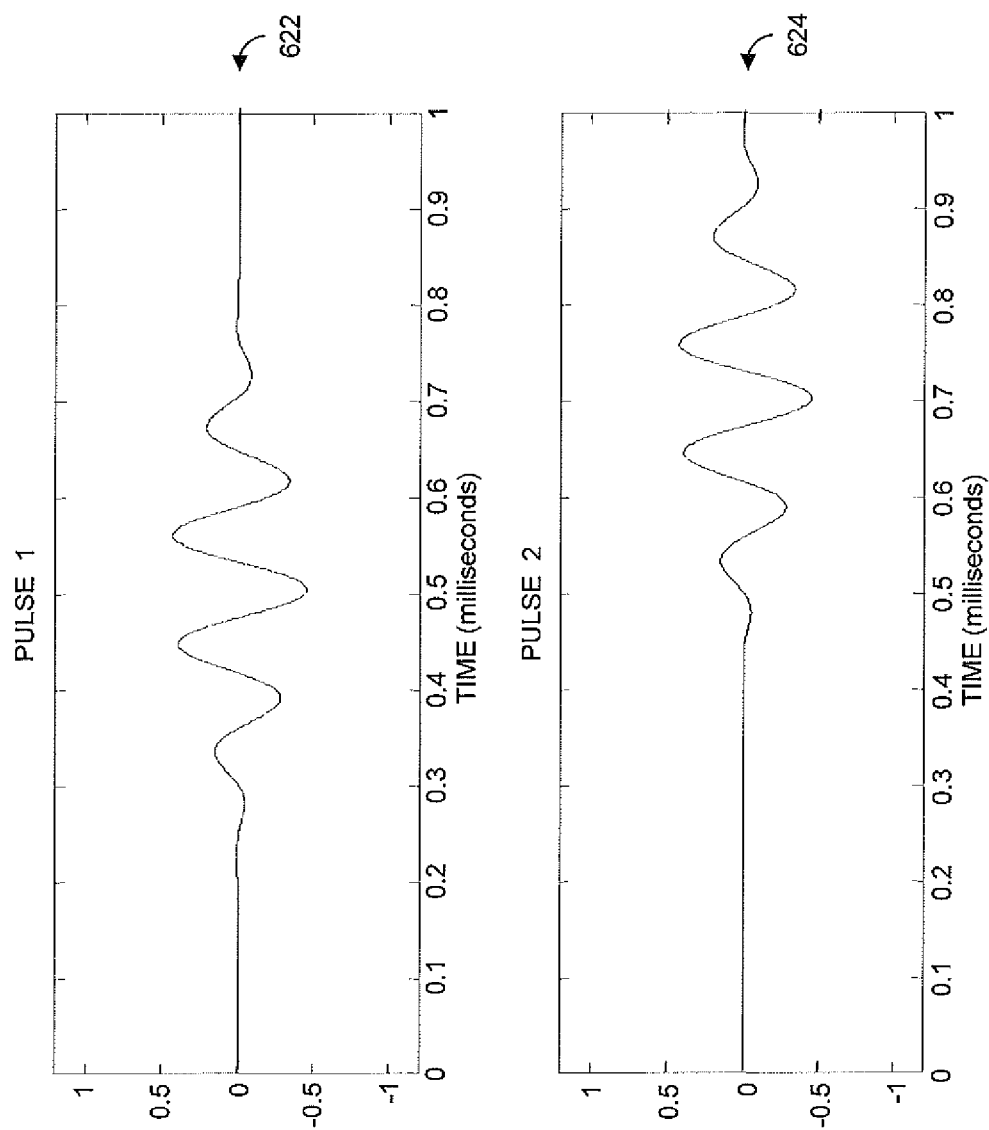
FIG. 9 is a graphical representation of the multiplication products of FIG. 8 after low pass filtering.

Referring back to FIG. 6, the output from each multiplier is digitally filtered in a low pass filter to pass only the low frequency products. FIG. 9 shows the pulse 1 low frequency product 618 and the pulse 2 low frequency product 620 of FIG. 8 after being low pass filtered to provide the respective pulse 1 signal and pulse 2 signals 622 and 624 for correlation. The correlator 20 obtains these signals and correlates then as previously described to obtain a TDOA between the microphones for the emitted ultrasonic pulse.

Figure 10:
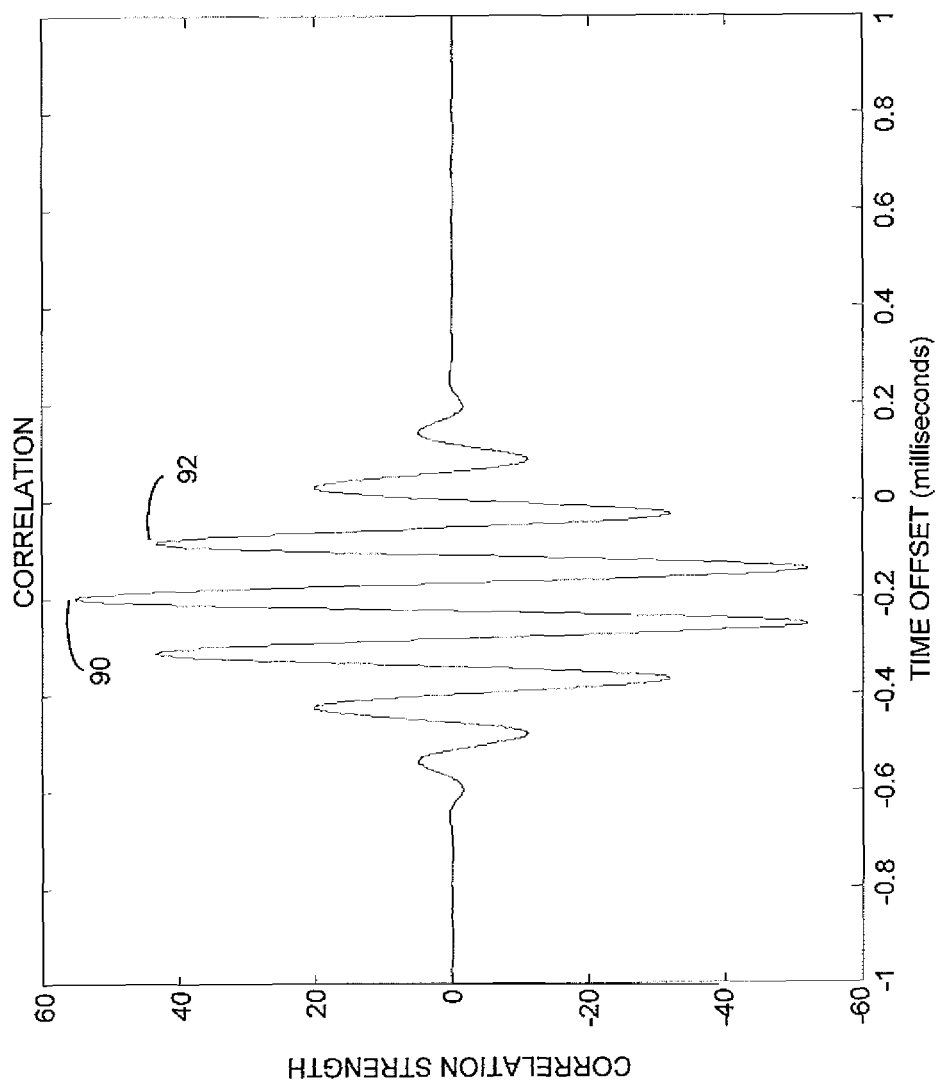
FIG. 10 is a graphical representation of a correlation result from the two low pass multiplication products of FIG. 9.

FIG. 10 shows the correlation buffer results from two signals 622 and 624 of FIG. 9. The key point to recognize here is that the margin between the maximum correlation point 90 and an adjacent correlation point 92 resulting from the use of the dual frequencies in the present invention is about 21.4%, which is far better than the 1.1% margin of the previous single frequency embodiment of FIG. 5. Accordingly, the present invention provides much improved TDOA accuracy and locationing.

However, if the system is subject to more than one cycle error, i.e. incorrect correlation to farther cycles than just the adjacent cycle, a less aggressive frequency selection must be made to reduce the correlation strength of those farther cycle points. The optimal frequency selection becomes difficult to calculate when the amplitudes vary during the burst. Therefore, frequency selection was computer modeled considering±four cycles. Real world amplitude shaping was simulated to be 24% reduction in correlation strength of all cycles. However, 15% was measured on the actual system using the finally chosen modeled frequencies of 40.3 KHz and 49.0 KHz. These choice of these two frequencies results in a correlation strength of the correct cycle being considerably larger than that of the adjacent cycles, as shown in FIG. 10, thereby providing increased immunity to noise and non-ideal components.

Looking at FIG. 10, the sharpness of the correlation peak 90 is not as sharp as the correlation peak 50 of FIG. 5. Therefore, even though FIG. 10 provides the correct cycle, the actual measurement of TDOA is less accurate than it would be if choosing the correct cycle from FIG. 5. In other words it can be difficult to find the exact peak of a sine wave, and therefore having a sine wave of a higher frequency will provide a more accurate time offset measurement. Therefore, the present invention can optionally combine the results from FIG. 10 with FIG. 5 to provide a more exact time offset measurement.

Referring back to FIG. 6, the present invention can provide a second correlator 600 that can take a single frequency correlation (as was done for FIGS. 4 and 5) for use to improve the time offset measurement. For example, the same frequency component, 610 and 614, (although 612 and 616 could have been used) of each pulse chain is correlated in correlator 600 to provide the combined result of FIG. 5. The sine waves of FIG. 5 are on approximately 40.3 kHz cycles, whereas the sine waves of FIG. 10 are on approximately 8.7 kHz cycles. Therefore, FIG. 5 can provide almost a 5×(40.3/ 8.7) improvement in TDOA measurement assuming the correct cycle is chosen. In practice, the±time offset measurement error at 8.7 kHz is sufficient to bracket the correct cycle in FIG. 5 and then the measured time offset of the correct cycle in FIG. 5 is used to provide the more accurate TDOA result. In effect, the correlation result of FIG. 5 is used to fine tune the correlation result of FIG. 10.

In effect, the present invention provides a novel technique to determine if a correlation is wrong and how the correct cycle can be found with a high degree of confidence. If after correlating the $f_1$ outputs, 610 and 614, from each microphone chain in correlator 600, it is determined that the TDOA between the two pulses is $T_{TDOA}$ microseconds, then it can be confirmed that the difference in phase between $f_1$ and $f_2$ at any time t microseconds on one microphone will be identical to the difference in phase between $f_1$ and $f_2$ on the other microphone at time t+$T_{TDOA}$ microseconds. Therefore, the qualifying test for a correct TDOA calculation is:

$$\Delta\phi_{mic1}(t)=\Delta\phi_{mic2}(t+T_{TDOA})$$

One way to measure the changes in relative phase between the two frequencies is to multiply them together (see FIG. 8). The trigonometric identity for the product of two different frequencies yields terms with both the sum and difference frequency:

$$\sin(f_1 t)*\sin(f_2 t)=\tfrac{1}{2}*[\cos((f_1-f_2)t)-\cos((f_1+f_2)t)]$$

Filtering out the higher frequency sum component leaves the difference (beat) frequency (see FIG. 9) which represents the relative change in phase between the two sine waves. Cross correlating the two low pass filter outputs (see FIG. 10) give a good measurement of the TDOA between the channels accurate to well under half a cycle of the original $f_1$ and $f_2$ input frequencies. This TDOA value can then be used to choose the correct correlation cycle on the original single frequency correlation of FIG. 5 to obtain the true TDOA.

Figure 11:
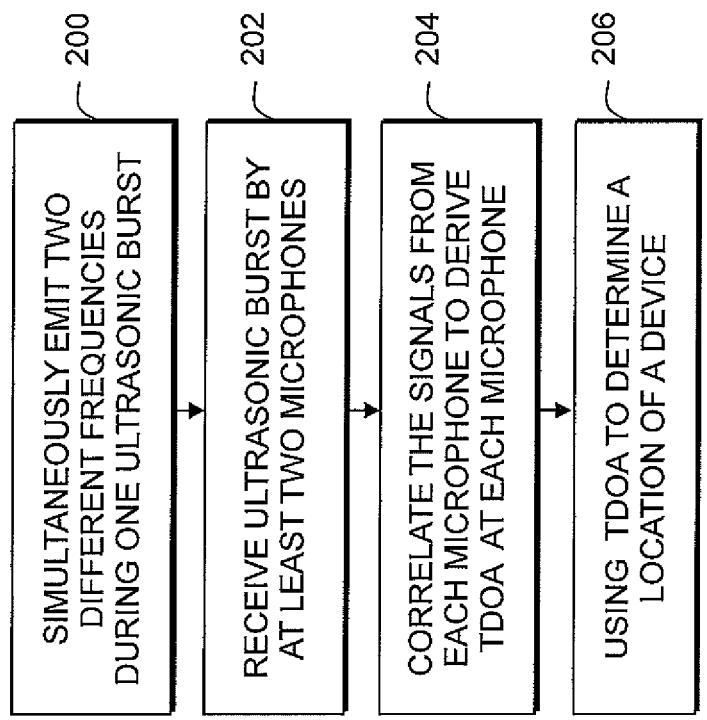
FIG. 11 flow diagram illustrating a method for ultrasonic locationing, in accordance with some embodiments of the present invention.

FIG. 11 is a diagram illustrating a method of dual frequency ultrasonic locationing, according to some embodiments of the present invention.

A first step 200 includes simultaneously emitting two different frequencies in one ultrasonic burst from at least one emitter of a mobile device.

A next step 202 includes receiving the two different ultrasonic frequencies simultaneously in the ultrasonic burst from at least one emitter in each of at least two microphones. This step can include band pass filtering each microphone, a first band pass filter passing a first frequency component from the ultrasonic burst and a second band pass filter passing a second frequency component from the ultrasonic burst different from the first frequency component. This step can also include multiplying the first and second frequency components from its respective microphone in the digital domain to provide the obtained signals for the correlator. This step can also include low pass filtering that passes a difference frequency of a multiplied combination of the two different ultrasonic frequency components from each microphone to the correlator.

A next step 204 includes correlating the signals obtained from each microphone to derive a time difference of arrival of the ultrasonic burst at each microphone. This step can also include a second correlation of a same frequency component from each microphone to produce a single frequency correlation, and wherein the correlation providing its time difference of arrival measurement to the second correlation which is used to select the correct correlation cycle in the single frequency correlation and its respective time difference of arrival measurement.

A next step 206 includes using the time difference of arrival of the ultrasonic signal from the emitter(s) impinging on each microphone to determine a location of the emitter and mobile device.

Advantageously, the present invention provides an accurate ultrasonic locationing system using dual frequencies an ultrasonic receiver integrated with closely spaced microphones, which is not known in the prior art. In addition, the present invention provides reasonable immunity to close reflectors (multipath signals), and a reasonable minimum SNR ratio. The present invention has been demonstrated in the lab to show a large increase in correlation strength when subject to actual Center of Excellence in Wireless and Information Technology (CEWIT) noise environment. The present invention opens the door to phase measurements which have been shown to provide even more immunity against picking the wrong cycle during correlation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors or processing devices such as microprocessors, digital signal processors, customized processors and field programmable gate arrays and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits, in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a compact disc Read Only Memory, an optical storage device, a magnetic storage device, a Read Only Memory, a Programmable Read Only Memory, an Erasable Programmable Read Only Memory, an Electrically Erasable Programmable Read Only Memory, and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A dual frequency ultrasonic locationing system, comprising:
    at least one emitter operable to emit two different ultrasonic frequencies simultaneously in one ultrasonic burst;
    a receiver with at least two microphones operable to receive the ultrasonic burst; and a correlator operable to correlate the signals obtained from each microphone to derive a time difference of arrival of the ultrasonic burst between each microphone, wherein the time difference of arrival of the ultrasonic burst from the emitter impinging on each microphone is utilized with a multilateration locationing technique to determine a location of the emitter; and wherein the receiver includes a low pass filter that passes a difference frequency of a multiplied combination of the two different ultrasonic frequency components from each microphone to the correlator.

2. A dual frequency ultrasonic locationing system, comprising:

at least one emitter operable to emit two different ultrasonic frequencies simultaneously in one ultrasonic burst;

a receiver with at least two microphones operable to receive the ultrasonic burst; and a correlator operable to correlate the signals obtained from each microphone to derive a time difference of arrival of the ultrasonic burst between each microphone, wherein the time difference of arrival of the ultrasonic burst from the emitter impinging on each microphone is utilized with a multilateration locationing technique to determine a location of the emitter; and wherein the receiver includes two band pass filters for each microphone, a first band pass filter passing a first frequency component from the ultrasonic burst and a second band pass filter passing a second frequency component from the ultrasonic burst different from the first frequency component.

3. The system of claim 2, wherein the receiver also includes a multiplier for each microphone, wherein each multiplier multiplies the first and second frequency components from its respective microphone in the digital domain to provide the obtained signals for the correlator.

4. The system of claim 2, further comprising a second correlator, wherein the second correlator correlates a same frequency component from each microphone to produce a single frequency correlation, and wherein the correlator provides its time difference of arrival measurement to the second correlator which is used to select the correct correlation cycle in the single frequency correlation and its respective time difference of arrival measurement.

5. A dual frequency ultrasonic locationing system, comprising:

at least one emitter operable to emit two different ultrasonic frequencies simultaneously in one ultrasonic burst;

a receiver with at least two microphones operable to receive the ultrasonic burst; and a correlator operable to correlate the signals obtained from each microphone to derive a time difference of arrival of the ultrasonic burst between each microphone, wherein the time difference of arrival of the ultrasonic burst from the emitter impinging on each microphone is utilized with a multilateration locationing technique to determine a location of the emitter; and wherein the microphones are incorporated in a singular housing and are configured in an array having a maximum dimension of not more than twelve inches.

6. system of claim 1, comprising two emitters to emit the two frequencies, respectively.

7. A dual frequency ultrasonic locationing system, comprising:

at least one emitter operable to emit two different ultrasonic frequencies simultaneously in one ultrasonic burst;

a receiver with at least two microphones operable to receive the ultrasonic burst; and a correlator operable to correlate the signals obtained from each microphone to derive a time difference of arrival of the ultrasonic burst between each microphone, wherein the time difference of arrival of the ultrasonic burst from the emitter impinging on each microphone is utilized with a multilateration locationing technique to determine a location of the emitter; and wherein the receiver can test for a correct time difference of arrival calculation, wherein a qualifying test for a correct TDOA calculation is: $\Delta\phi_{mic1}(t) = \Delta\phi_{mic2}(t+T_{TDOA})$, where $\Delta\phi_{mic1}(t)$ is the difference in phase between $f_1$ and $f_2$ at any time t on one microphone and $\Delta\phi_{Tmic2}(t+T_{TDOA})$ is in phase between $f_1$ and $f_2$ at time $t+T_{TDOA}$, where $T_{TDOA}$ is the determined time difference of arrival calculation between the pulses from each microphone.

* * * * *